Sept. 3, 1957 H. A. ELLIOTT ET AL 2,804,968
FEED ROLLS
Filed Feb. 10, 1954 2 Sheets-Sheet 1

HERSCHEL A. ELLIOTT
ERNEST M. FRANKLIN
INVENTOR.

BY Ernest G. Peterson
AGENT.

Sept. 3, 1957  H. A. ELLIOTT ET AL  2,804,968
FEED ROLLS
Filed Feb. 10, 1954  2 Sheets-Sheet 2

INVENTOR
HERSCHEL A. ELLIOTT
ERNEST M. FRANKLIN

BY Ernest G. Peterson
AGENT

United States Patent Office 2,804,968
Patented Sept. 3, 1957

2,804,968

FEED ROLLS

Herschel A. Elliott, Sayreville, and Ernest M. Franklin, Nixon, N. J., assignors to Hercules Powder Company, Wilmington, Del., a corporation of Delaware Application February 10, 1954, Serial No. 409,288

9 Claims. (Cl. 203—230)

This invention relates to a feed roll assembly adapted to feed strand material into a cutter and more particularly to a feed roll assembly adapted to feed simultaneously a plurality of individual plastic strands into a cutter in order to prepare a granulated molding powder product.

One of the conventional methods for making granules of thermoplastic molding powder is to simultaneously extrude a plurality of strands of premixed and colloidized molding composition from a hot extruder, and then convey these strands, with suitable cooling, to a cutter or chopper where the strands are cut or chopped into granules of uniform size.

It is the general practice in the art to employ a feed roll assembly, also referred to as pinch rolls, for conveying and feeding the plurality of individual plastic strands simultaneously into the cutter and it has been customary to employ a feed roll assembly consisting of two rubber rolls, one rubber roll and one steel roll, or one rubber roll and an endless metal belt for this purpose. Any of these assemblies effectively feeds the strands to the cutter, but these prior art assemblies are subject to the shortcoming of creating a serious contamination problem due to the abrasive action of the plastic strands on the rubber. Rubber abraded from the roll by the plastic strands not only discolors the plastic but also contaminates the final molding powder product. Moreover, the amount of pull exerted by the pinch rolls on the plastic strands is limited due to lack of abrasion resistance of the rubber. Thus, when it is desirable to pull very long strands, or pull strands along a path with frictional resistance, the rolls wear out very quickly. Additionally, the cutter design is somewhat limited as it is necessary to have the pinch rolls at a distance from the cutter or otherwise protected so that individual plastic pellets do not become lodged between rubber rolls causing rapid deterioration.

Accordingly, it is the principal object of this invention to provide an improved feed roll assembly having a great diversity for removing the limitations heretofore existent.

Another object of this invention is to provide an improved feed roll assembly which combines the ability to effectively feed a plurality of individual strands simultaneously to a cutter with the ability to resist abrasion, thereby overcoming the problem of contamination of the resulting molding powder encountered by the art when employing a rubber roll or rolls.

Another object of this invention is to provide a roll having new and improved structural features, which combine resilient characteristics with great resistance to abrasion.

Other objects of the invention will appear hereinafter, the novel features and combinations being set forth in the appended claims.

Generally described, the present invention comprises a feed roll assembly having in combination a pair of parallel rolls axially journaled in a frame for rotation in juxtaposition with each other to form a nip, at least one of said rolls being a driving roll, and means for applying pressure to the rolls at the nip, at least one of said rolls comprising a hard nonresilient cylindrical core, a plurality of resilient ribs securely mounted longitudinally on said core around the circumference thereof in parallel spaced relationship, all of said ribs projecting radially outward from the periphery of said core substantially the same distance and being substantially coextensive in length with the working face of said roll, and a plurality of annular hard abrasion-resistant rings in side-by-side contact relationship fitted over said resilient ribs in friction-tight engagement therewith, said rings forming the working face of said roll.

A preferred embodiment of the invention has been chosen for purposes of illustration and description and is shown in the accompanying drawings forming a part of the specification wherein reference symbols refer to like parts wherever they occur.

Figure 1:
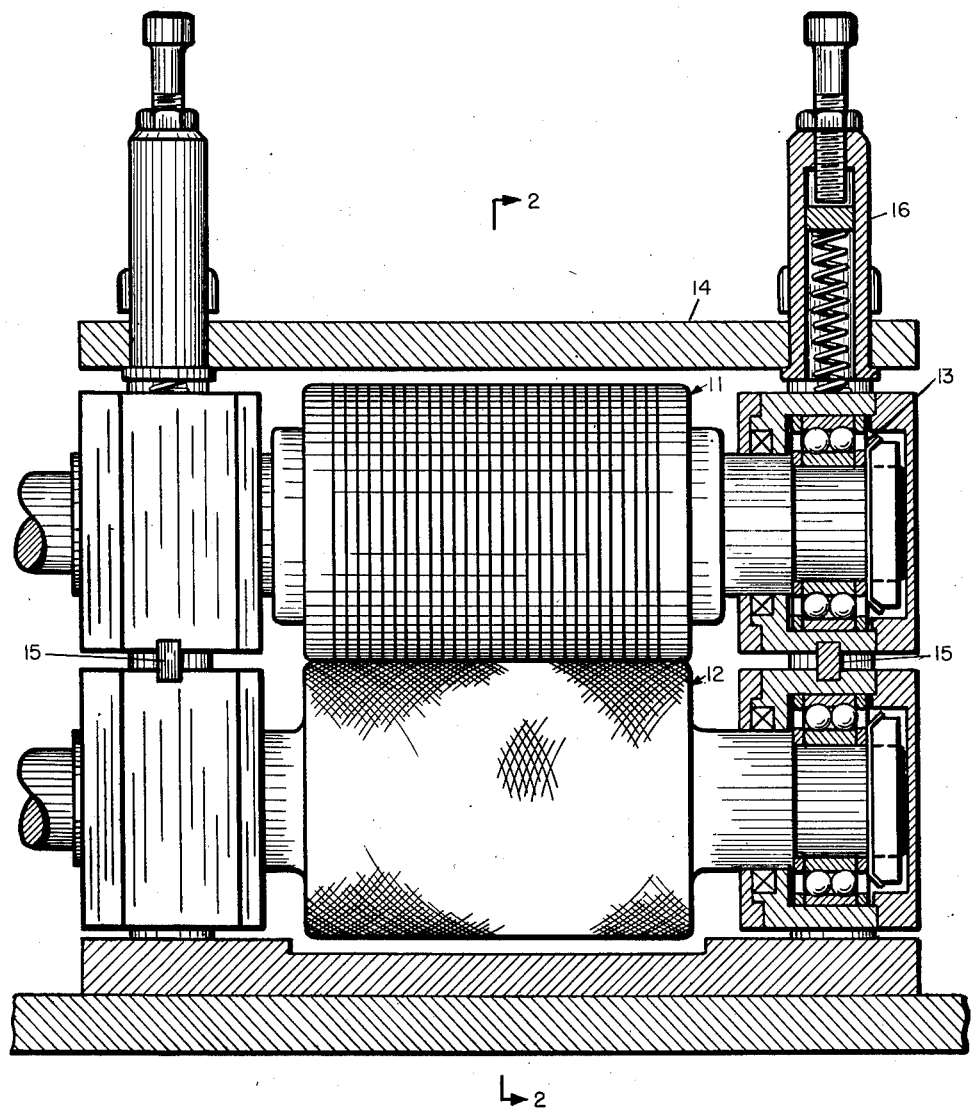
Fig. 1 is a front elevation, shown partly in section, of the feed roll assembly of this invention.
Figure 2:
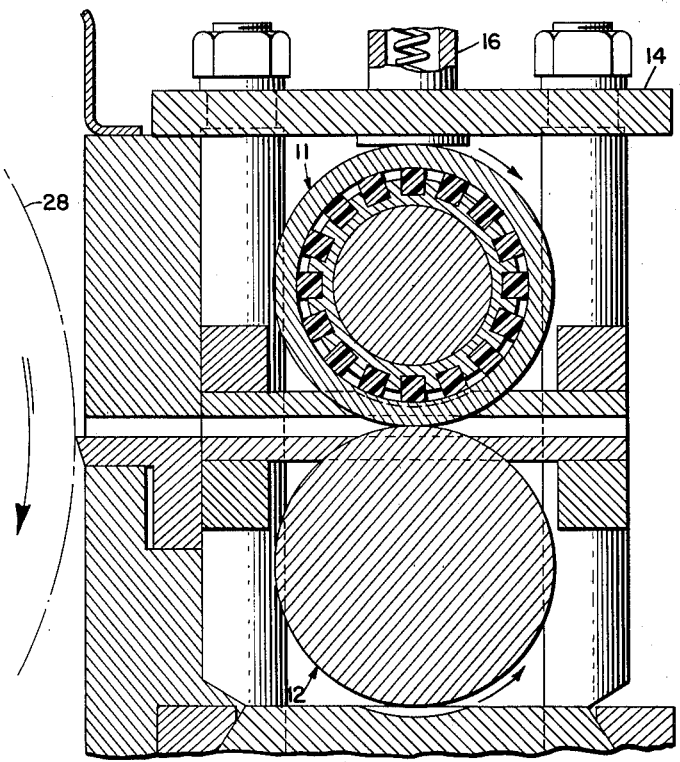
Fig. 2 is a vertical sectional view taken along section 2—2 of Fig. 1.

With reference to Figs. 1 and 2 there is provided a pair of parallel rolls 11 and 12 axially journaled with ball bearings 13 in a frame 14 for rotation in juxtaposition with each other to form a nip. Clearance between the rolls is adjusted by means of wedges 15. In a preferred embodiment roll 12 is a driving roll provided with conventional driving means (not shown), and roll 11 is an idler roll. Adjustable springs 16 provide means for applying pressure to the rolls at the nip. Arc 28 in Fig. 2 represents the path of a conventional rotary cutter or chopper (not shown).

Figure 3:
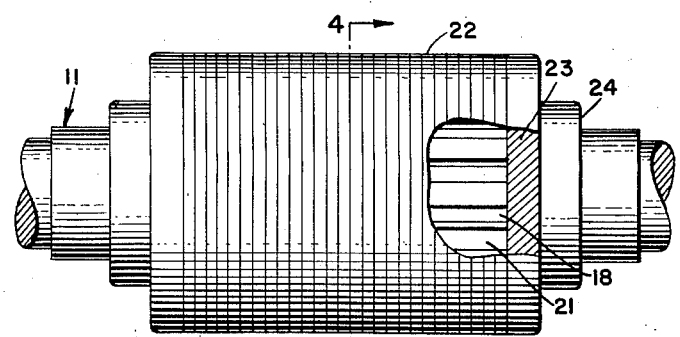
Fig. 3 is a front elevation view, partly in section, of the new and improved roll in accordance with this invention.
Figure 4:
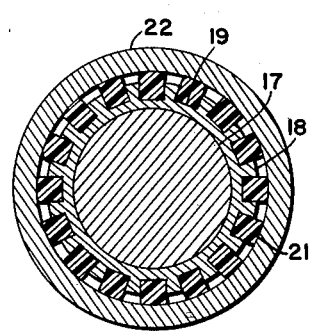
Fig. 4 is a cross-sectional view of the new and improved roll taken along section 4—4 of Fig. 3.

With reference to Figs. 3 and 4, roll 11 is provided with a hard nonresilient cylindrical core 17. An annular hard nonresilient sleeve 18 is press fitted over core 17, sleeve 18 having a plurality of parallel longitudinal slots 19 in spaced relationship around the circumference and extending from end to end thereof, sleeve 18 being substantially coextensive in length with the working face of roll 11. Each of the slots 19 is provided with a resilient rib 21 securely mounted therein and coextensive in length therewith, all of ribs 21 projecting radially outward from the periphery of sleeve 18 substantially the same distance, thus providing an annular arrangement of alternate parallel longitudinal resilient ribs and open spaces around the periphery of sleeve 18. A plurality of annular hard abrasion-resistant rings 22 in side-by-side contact relationship are fitted over ribs 21 in friction-tight engagement therewith, the periphery of rings 22 forming the working face of roll 11. A cheek plate 23 and a threaded nut 24 at each end of roll 11 provide means for securing rings 22 in place.

Figure 5:
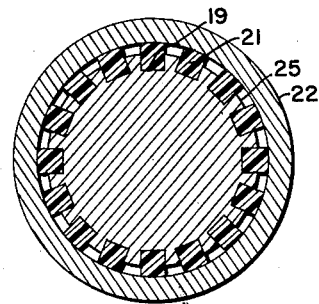
Figs. 5 and 6 are cross-sectional views of the new and improved roll, similar to Fig. 4, illustrating other alternative structural embodiments for this roll.

In another embodiment of the invention, as illustrated in Fig. 5, roll 11 is provided with a hard nonresilient cylindrical core 25 having a plurality of parallel longitudinal slots 19 in spaced relationship around the circumference of core 25 and extending from end to end thereof, core 25 being substantially coextensive in length with the working face of roll 11. Slotted core 25 thus is equivalent to core 17 and sleeve 18 in Fig. 4. Resilient ribs 21 and rings 22 are substantially the same as illustrated in Fig. 4.

Figure 6:
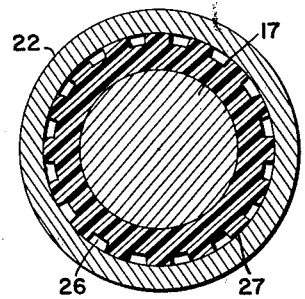

In another embodiment of the invention, as illustrated in Fig. 6, roll 11 is provided with a hard nonresilient cylindrical core 17 similar to the core illustrated in Fig. 4. An annular resilient sleeve 26 is fitted around core 17 in friction-tight engagement therewith and substantially coextensive in length with the working face of roll 11, resilient sleeve 26 being provided with a plurality of parallel longitudinal ribs 27 of the same material as sleeve 26 in spaced relationship around the circumference of and projecting radially outward from sleeve 26 substantially the same distance, ribs 27 being substantially coextensive in length with sleeve 26. Rings 22 are substantially the same as illustrated in Fig. 4.

As set forth hereinbefore, roll 12 is a driving roll and roll 11 is an idler roll in the embodiment illustrated in Fig. 1. The invention, however, should not be construed as so limited, for either or both of the rolls can be driving rolls as desired, and either or both rolls can embody the structural features of roll 11. The rolls can be of any size desired, both with respect to length and diameter, depending largely upon the purpose intended for the feed roll assembly. With respect to diameter, the rolls can be as small as an inch or even less in diameter or as much as 12 inches, 16 inches, or larger in diameter, as desired. With respect to length, the working face of the rolls can be as short as two or three inches or less to as much as 24 inches, 36 inches, or more in length. For feeding molding powder strands to a cutter to make molding powder granules, rolls having diameters of about four inches and working faces of about six inches are preferred.

Other conventional means such as hydraulic pistons or compressed air actuated pistons or other equivalent means can be employed to exert pressure on the rolls at the nip instead of the adjustable springs 16, as illustrated.

In a preferred embodiment, roll 12 is constructed of stainless steel and has a knurled working face. However, this roll can be constructed of any hard nonresilient material. For most purposes, a metal will be the material of construction, such as steel, stainless steel, brass, bronze, aluminum alloys, and cast iron, and the like. However, for some purposes, wood or a hard rigid plastic material such as nylon or Teflon would be suitable. Although a knurled working face provides greater traction and is generally preferred, the working face can be smooth, if desired.

The structural features of roll 11 constitute an important aspect of this invention. As seen on the drawings, this roll is provided with a hard nonresilient cylindrical core which, for most purposes, will be of metal, such as steel, stainless steel, brass, bronze, aluminum alloys, cast iron, or the like. For some purposes, however, a hard rigid plastic material such as nylon or Teflon would be entirely suitable. Steel is preferred. In the embodiment illustrated in Fig. 4 the hard nonresilient sleeve 18 will also be of a metal or hard rigid plastic material. Again steel is preferred.

Roll 11 is provided with a plurality of resilient ribs securely mounted longitudinally on the core around the circumference thereof in parallel spaced relationship, all of the ribs projecting radially outward from the periphery of the core substantially the same distance and being substantially coextensive in length with the working face of the roll. These ribs may be constructed of any resilient material such as natural rubber, or any synthetic rubber or rubberlike material, as will be apparent to those skilled in the art, for there are many suitable well-known commercially availble rubbery and rubberlike materials to choose from. In one embodiment of this invention, the resilient ribs are constructed of vulcanized natural rubber.

While the drawings illustrate 16 such ribs, the invention is in no way limited in this respect, and either more or less resilient ribs can be employed as desired. The important feature is that the ribs must be spaced apart so that there is provided an annular arrangement of alternate parallel longitudinal resilient ribs and open spaces around the periphery of the core. This arrangement is important for it provides space adjacent to each rib for lateral displacement of the rib when placed under compression.

Roll 11 is provided with a plurality of annular hard abrasion-resistant rings in side-by-side contact relationship fitted over the resilient ribs in friction-tight engagement therewith, the periphery of these annular rings forming the working face of the roll. In a preferred embodiment, these rings are made of a nylon plastic. However, any hard abrasion-resistant material is suitable in accordance with this invention. By way of example but not in limitation, these rings for many purposes can be constructed of metal such as stainless steel, steel, brass, bronze, aluminum alloys, and the like or a hard abrasion-resistant plastic such as Teflon or a similar plastic having properties like those possessed by nylon. The important characteristics of the material are hardness, toughness, and abrasion resistance.

There are at least as many of these annular hard abrasion-resistant rings as there are individual strands to be fed to the cutter. In the drawings, there are shown 27 such rings, thus providing for the conveyance and feeding of 27 individual plastic strands. Radially these rings can range in thickness from about ⅛ inch up to 2 inches or even more. In width each ring must be at least as wide as the cross-sectional thickness of one individual strand of material being fed, but preferably should not be as wide as the thickness of two such strands. These rings are constructed with substantially smooth sides so that each ring can slide radially past adjacent rings on either side in response to inequalities in the cross section of the individual strands being fed. Thus, in effect each individual strand of material being fed to the cutter is provided with a separate working face consisting of one ring which is free to move radially in response to inequalities in the cross section of the strand being fed without interfering with the simultaneous positive feed of any other strand. To insure proper operation of the roll, the retaining nuts at each end of the roll are adjusted sufficient to bring the rings into side-by-side contact relationship but are not tightened so much as to prevent each ring from sliding radially past adjacent rings in response to inequalities in the cross section of the individual strands being fed.

For greatest flexibility the feed roll assembly and cutter are independently driven by conventional variable speed drives so that there is complete and independent control of the rate of feeding and the rate of cutting of the fed strands.

A feed roll assembly as illustrated in Fig. 1, wherein roll 12 is a stainless steel driving roll having a knurled working face and roll 11 is an idler roll having resilient rubber ribs and 27 nylon rings forming the working face of the roll, has been employed continuously for long periods of time to simultaneously feed 18 to 20 individually extruded strands of colloidized cellulose acetate molding composition to a rotary cutter which cut the strands into molding powder granules of uniform size. Even after weeks and months of continued operation, there has been substantially no contamination of the molding powders thus produced arising from wear of the feed roll assembly. Moreover, the feed roll assembly has positively responded to inequalities in the cross section of individual strands being fed so that all strands have been positively and simultaneously fed to the cutter at the same uniform rate. Substantially the same desirable results have been obtained when the feed roll assembly of this invention has also been employed to feed a plurality of individual strands of other plastic molding compositions to a cutter, such as, for example, strands of ethyl cellulose plastic compositions, and strands of polystyrene plastic compositions.

It will be apparent to those skilled in the art that the feed roll assembly in accordance with this invention is useful, not only for simultaneously feeding a plurality of individual strands of plastic material to a cutter, but also for simultaneously feeding or conveying a plurality of individual strands of any material for any purpose, including, by way of example, threads, cords, wire, and the like.

What we claim and desire to protect by Letters Patent is:

1. A feed roll assembly having in combination a pair of parallel rolls axially journalled in a frame for rotation in juxtaposition with each other to form a nip, at least one of said rolls being a driving roll, and means for applying pressure to the rolls at the nip, at least one of said rolls comprising a hard nonresilient cylindrical core, a plurality of resilient ribs securely mounted longitudinally on said core around the circumference thereof in parallel spaced apart relationship providing an alternate annular arrangement of parallel longitudinal resilient ribs and open spaces therebetween around the periphery of said core, all of said ribs projecting radially outward from the periphery of said core substantially the same distance and being substantially coextensive in length with the working face of said roll, and a plurality of annular hard abrasion-resistant rings in side-by-side contact relationship fitted over said resilient ribs in friction-tight engagement therewith, said rings forming the working face of said roll.

2. A feed roll assembly having in combination a driving roll and an idler roll axially journaled in a frame parallel to each other for rotation in juxtaposition with each other to form a nip, and means for applying pressure to the rolls at the nip, the driving roll being constructed of hard nonresilient material, and the idler roll comprising in combination a hard nonresilient cylindrical core, a plurality of resilient ribs securely mounted longitudinally on said core around the circumference thereof in parallel spaced apart relationship providing an alternate annular arrangement of parallel longitudinal resilient ribs and open spaces therebetween around the periphery of said core, all of said ribs projecting radially outward from the periphery of said core substantially the same distance and being substantially coextensive in length with the working face of said roll, and a plurality of annular hard abrasion-resistant rings in side-by-side contact relationship fitted over said resilient ribs in friction-tight engagement therewith, said rings forming the working face of said roll.

3. A feed roll assembly having in combination a driving roll and an idler roll axially journaled in a frame parallel to each other for rotation in juxtaposition with each other to form a nip, and means for applying presure to the rolls at the nip, the driving roll being constructed of hard nonresilient material and the idler roll comprising in combination a hard nonresilient cylindrical core having a plurality of parallel longitudinal slots in spaced relationship around the circumference of said core and extending from end to end thereof, said slotted core being substantially coextensive in length with the working face of said roll, a resilient rib securely mounted in each of said slots and coextensive in length therewith, all of said ribs being in spaced apart relationship and projecting radially outward from the periphery of said core substantially the same distance providing an alternate annular arrangement of parallel longitudinal resilient ribs and open spaces therebetween around the periphery of said core, and a plurality of annular hard abrasion-resistant rings in side-by-side contact relationship fitted over said resilient ribs in friction-tight engagement therewith, said rings forming the working face of said roll.

4. A feed roll assembly having in combination a driving roll and an idler roll axially journaled in a frame parallel to each other for rotation in juxtaposition with each other to form a nip, and means for applying pressure to the rolls at the nip, the driving roll being constructed of hard nonresilient material, and the idler roll comprising in combination a hard nonresilient cylindrical core, an annular resilient sleeve fitting around said core in friction-tight engagement therewith and substantially coextensive in length with the working face of said roll, said sleeve being provided with a plurality of parallel longitudinal ribs of the same material as said sleeve in spaced apart relationship around the circumference of and projecting radially outward from said sleeve substantially the same distance providing an alternate annular arrangement of parallel longitudinal resilient ribs and open spaces therebetween around the periphery of said sleeve, said ribs being substantially coextensive in length with said sleeve, and a plurality of annular hard abrasion-resistant rings in side-by-side contact relationship fitted over said resilient ribs in friction-tight engagement therewith, said rings forming the working face of said roll.

5. A feed roll assembly having in combination a driving roll and an idler roll axially journaled in a frame parallel to each other for rotation in juxtaposition with each other to form a nip, and means for applying pressure to the rolls at the nip, the driving roll being constructed of hard nonresilient material, and the idler roll comprising in combination a hard non-resilient cylindrical core, an annular hard nonresilient sleeve press fitted over said core, said sleeve having a plurality of parallel longitudinal slots in spaced relationship around the circumference and extending from end to end thereof, said sleeve being substantially coextensive in length with the working face of said roll, a resilient rib securely mounted in each of said slots and coextensive in length therewith, all of said ribs being in spaced apart relationship and projecting radially outward from the periphery of said sleeve substantially the same distance providing an alternate annular arrangement of parallel longitudinal resilient ribs and open spaces therebetween around the periphery of said sleeve, and a plurality of annular hard abrasion-resistant rings in side-by-side contact relationship fitted over said resilient ribs in friction-tight engagement therewith, said rings forming the working face of said roll.

6. A feed roll assembly having in combination a driving roll and an idler roll axially journaled in a frame parallel to each other for rotation in juxtaposition with each other to form a nip, and means comprising adjustable springs for applying pressure to the rolls at the nip, the driving roll being stainless steel having a knurled working face, the idler roll comprising in combination a cylindrical steel core having a plurality of parallel longitudinal slots in spaced relationship around the circumference and extending from end to end thereof, said slotted core being substantially coextensive in length with the working face of said roll, a resilient rubber rib securely mounted in each of said slots and coextensive in length therewith, all of said ribs being in spaced apart relationship and projecting radially outward from the periphery of said core substantially the same distance providing an alternate annular arrangement of parallel longitudinal resilient ribs and open spaces therebetween around the periphery of said core, and a plurality of annular nylon rings in side-by-side contact relationship fitted over said rubber ribs in friction-tight engagement therewith, said rings forming the working face of said roll.

7. A feed roll assembly having in combination a driving roll and an idler roll axially journaled in a frame parallel to each other for rotation in juxtaposition with each other to form a nip, and means comprising adjustable springs for applying pressure to the rolls at the nip, the driving roll being stainless steel having a knurled working face, the idler roll comprising in combination a cylindrical steel core, an annular steel sleeve press fitted over said core, said sleeve having a plurality of parallel longitudinal slots in spaced relationship around the circumference and extending from end to end thereof, said sleeve being substantially coextensive in length with the working face of said roll, a resilient rubber rib securely mounted in each of said slots and coextensive in length therewith, all of said ribs being in spaced apart relationship and projecting radially outward from the periphery of said core substantially the same distance providing an alternate annular arrangement of parallel longitudinal resilient ribs and open spaces therebetween around the periphery of said core, and a plurality of annular nylon rings in side-by-side contact relationship fitted over said rubber ribs in friction-tight engagement therewith, said rings forming the working face of said roll.

8. As an article of manufacture, a roll having in combination a hard nonresilient cylindrical core, a plurality of resilient ribs securely mounted longitudinally on said core around the circumference thereof in parallel spaced apart relationship providing an alternate annular arrangement of parallel longitudinal resilient ribs and open spaces therebetween around the periphery of said core, all of said ribs projecting radially outward from the periphery of said core substantially the same distance and being substantially coextensive in length with the working face of said roll, a plurality of annular hard abrasion-resistant rings in side-by-side contact relationship fitted over said resilient ribs in friction-tight engagement therewith, said rings forming the working face of said roll, and means for securing said rings in place.

9. As an article of manufacture, a roll having in combination a cylindrical steel core having a plurality of parallel longitudinal slots in spaced relationship around the circumference and extending from end to end thereof, said slotted core being substantially coextensive in length with the working face of said roll, a resilient rubber rib securely mounted in each of said slots and coextensive in length therewith, all of said ribs being in spaced apart relationship and projecting radially outward from the periphery of said core substantially the same distance providing an alternate annular arrangement of parallel longitudinal resilient ribs and open spaces therebetween around the periphery of said core, a plurality of annular nylon rings in side-by-side contact relationship fitted over said rubber ribs in friction-tight engagement therewith, said rings forming the working face of said roll, and means for securing said rings in place.

References Cited in the file of this patent

UNITED STATES PATENTS

| | | |
|---|---|---|
| 916,037 | Scott | Mar. 23, 1909 |
| 996,970 | Burnham | July 4, 1911 |
| 1,181,752 | Everett et al. | May 2, 1916 |
| 2,254,501 | Solem | Sept. 2, 1941 |

FOREIGN PATENTS

| | | |
|---|---|---|
| 158,922 | Germany | June 23, 1904 |
| 321,866 | Germany | June 15, 1926 |